R. A. FESSENDEN.
METHOD FOR DETERMINING POSITIONS OF VESSELS.
APPLICATION FILED DEC. 14, 1904. RENEWED MAR. 18, 1907.

941,565.

Patented Nov. 30, 1909.

UNITED STATES PATENT OFFICE.

REGINALD A. FESSENDEN, OF WASHINGTON, DISTRICT OF COLUMBIA, ASSIGNOR TO THE NATIONAL ELECTRIC SIGNALING COMPANY, OF PITTSBURG, PENNSYLVANIA, A CORPORATION OF NEW JERSEY.

METHOD FOR DETERMINING POSITIONS OF VESSELS.

941,565.      Specification of Letters Patent.      Patented Nov. 30, 1909.

Application filed December 14, 1904, Serial No. 236,861. Renewed March 18, 1907. Serial No. 363,106.

*To all whom it may concern:*

Be it known that I, REGINALD A. FESSENDEN, a citizen of the United States, and resident of Washington, District of Columbia, have invented a certain new and useful Method for Determining Positions of Vessels, of which the following is a specification.

The invention herein described relates to the art of locating the position of ships at sea more especially during night-time and cloudy or foggy weather.

Figure 1:
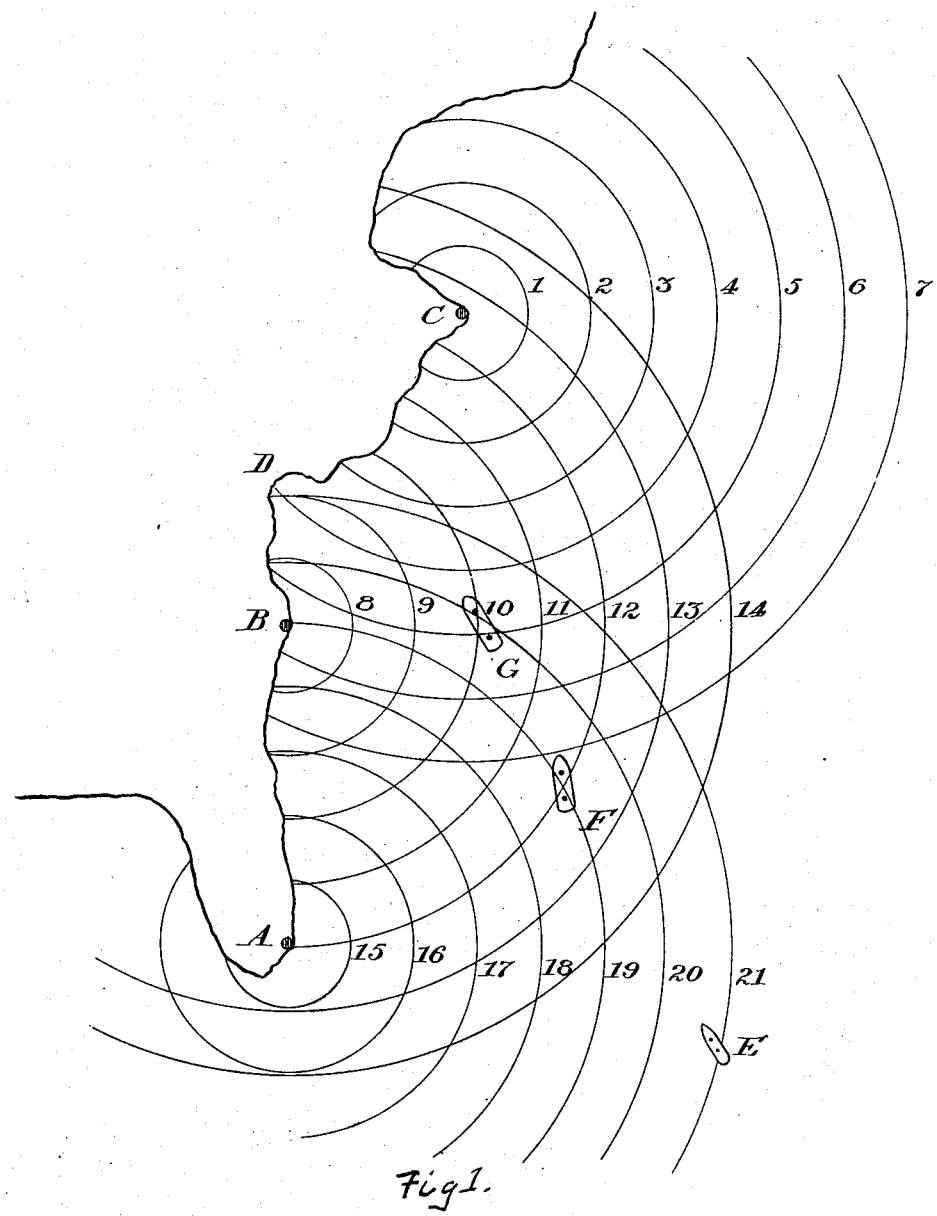
Figure 2:
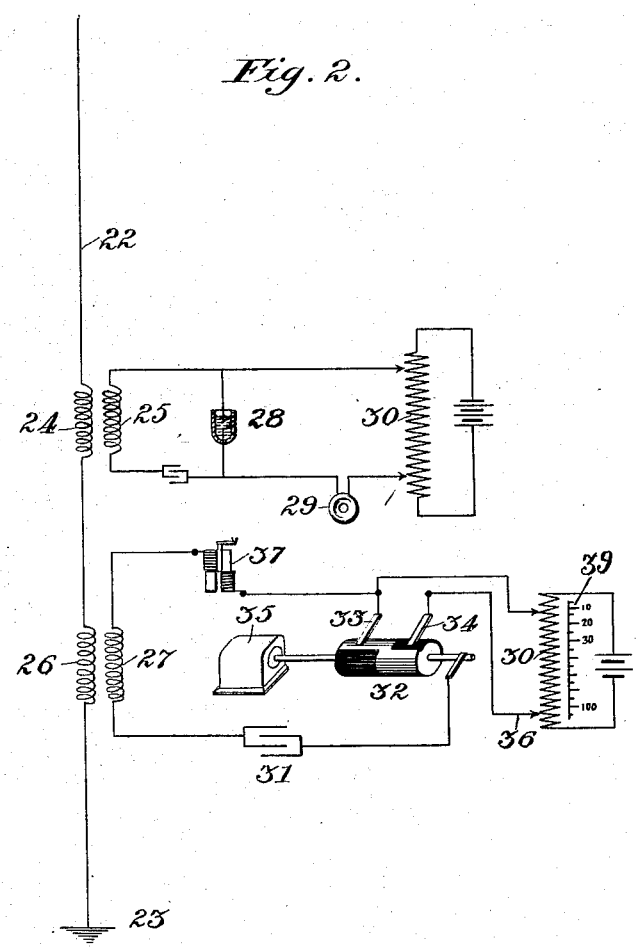

In the accompanying drawings forming a part of this specification Figure 1 is a diagrammatic view illustrating my improved method, and Fig. 2 is a similar view illustrating a form of apparatus for giving standard signals.

In the practice of my invention I employ one, two or more wireless telegraph stations located at fixed points such as lighthouses or light ships. The vessel whose position is to be determined also carries a wireless apparatus.

Signals are sent out, preferably at regular intervals, by the fixed station and in the method herein described the vessel locates its position by comparing the strength of the signals received either relatively or absolutely. While I do not limit myself to either method, it is preferred not to depend entirely upon the absolute measurements because of the serious consequences which may result, but to compare the intensity of the signals either relatively to each other or else relatively to each other and to a source of fixed strength located on board the vessel, or both.

If absolute measurement of intensity is depended upon alone, any defect in the apparatus which may cause the signals to have less intensity than they properly should would result in the ship's being located much closer to land than she really was and hence such method, while it may be used, is preferably not relied upon entirely but is checked by the use as above mentioned of a standard on board the vessel and preferably also by comparison of the relative strengths of the signals from the several fixed stations.

In the practice of my invention A, B, and C, which are wireless stations, are situated on the coast or in any fixed or known places. These stations are preferably equipped with both sending and receiving apparatus. The sending apparatus is preferably automatic in its action but at least automatic during a part of the time, so that predetermined signals may be sent continuously or at predetermined intervals in a manner similar to changes now effected in coast lights or audible signals. For example, station C may be arranged to send by clock-work suitable signals, as numerals 1, 2, 3, 4, 5, 6 and 7, repeated continuously, at predetermined time intervals, or sent out in any desired manner. During intervals between signals or series of signals the station may be put in a receiving condition. The signals may be differentiated in any other desired manner, for example by being of different electrical or different group tunes and may cause the same or different receivers or indicating mechanisms on board the vessel to respond. Instead of numerals any other arbitrary or well-known signals may be used.

The strength of the signals is preferably varied so as to form a succession of signals of gradually varying intensity and preferably so that each signal shall be readable or shall produce the same intensity at a point a given number of miles, for example twenty miles farther or nearer from the station than the signal immediately preceding it. For example signal 1 may be readable at a distance of twenty miles, signal 2 at forty, signal 3 at sixty and so on up to any desired distance. Preferably, however, the strength of the signals is arranged so that they shall not be readable more than three or four hundred miles from shore, though the same stations may emit other signals of greater or less intensity for other purposes. Similarly the station B emits a succession of signals, for example 8, 9, 10, 11, 12, 13 and 14 which may be of a different tune or group frequency from those of station C but are preferably on the same tune and vary in intensity in the same way. These signals may be emitted simultaneously with those of station C but are preferably emitted immediately after the conclusion of the sending of signals of station C, and to this end the sending mechanisms at the several sending stations may be adjusted to send signals at predetermined time non-interfering intervals. Similarly the third station A may be similarly arranged to send out signals 15 to 21 or otherwise differentiated from the signals from other stations.

Where the sending of the signals of the station is arranged so that the groups of signals follow each other at predetermined intervals, these intervals are easily determined by the station B for example throwing on the receiving apparatus and listening to station C. In this way the times of sending of the signals can be readily checked and maintained at any desired interval.

In operation we may suppose the vessel to be bound for a port at the point D and to occupy successively the positions E, F and G. We may take the point E as that at which the signal 21 can be just distinguished if the apparatus is in good order, or else the point at which the signal 21 will have a strength equal with that given by the standardizing apparatus, if the latter be so arranged. This standardizing apparatus may consist of an auxiliary apparatus causing a signal of a given strength. This would normally indicate that the vessel was 140 miles away from station A but the exact direction would not be known. It may be, however, that some portion of the receiving apparatus, for example the antennæ on the ship may not be in good condition in which case the ship may really be closer in.

On the ship reaching the point F if the apparatus is in good order signals 12 and 19 will each be of equal intensity with the standardizing signal, or if no standardizing signal is used will be of equal intensity with each other. If the signals 12 and 19 have intensities equal to that of the corresponding standardizing signal the distances and directions of the stations A and B from the ship are determined. But if no standardizing apparatus is used and the signals from A and B are compared and found to be of equal intensities the direction but not the exact distances of the stations from the ship is determined.

On the ship reaching the point G, by the use of the standardizing apparatus we not only obtain the distance and direction from A and B but also have a check and determination of the distance from B to C since three sets of signals i. e., 5, 10 and 20 are now received of equal intensity with the standard. Even if the standardizing apparatus were not used or were out of order it is still possible to locate the position of the vessel, because there is only one point possible for the ship to occupy at which signals 5, 10 and 20 are of equal relative intensity.

By the above mentioned method it is possible for a ship to determine her position without taking an observation and during night time or fog.

Instead of sending the seven signals successively they may be sent simultaneously and on different wave frequencies or tunes.

Various modifications will suggest themselves to those skilled in the art and the method herein described is capable of being used with many different forms of apparatus described though the method is not limited to the use of such apparatus, as a great number of permutations and combinations can be made each of which may have its particular advantages in certain cases but which advantages are well known to those skilled in the art.

The standardizing apparatus may consist of an oscillatory apparatus causing a signal of a given strength or signals of given strengths. A suitable means for producing this is shown in Fig. 2 where 22 is an antenna grounded at 23, and 24 and 25 are coils of one transformer and 26 and 27 are coils of another transformer. The secondary 25 is operatively connected with the receiver 28, 29 is an indicating instrument as for example a telephone, and 30 is a potentiometer.

Electromagnetic waves striking the antenna produces indications of a certain character and strength in the indicator 29.

The coil 27 has one end connected with a capacity 31 and the other end with a commutator 32, having brushes 33 and 34 and preferably driven by a motor 35 in such a way that as the commutator revolves it charges the condenser 31 to a given voltage, determined by the position of the sliding contact 36 on the potentiometer 30, and then as the commutator revolves farther it discharges the condenser 31 through the coil 27. This discharge through the coil 27 produces currents in the coils 26, 24 and 25 and thereby affecting the receiver 28 producing an indication on the indicator 29 depending upon the position of the sliding contact 36.

The potentiometer is preferably provided with a scale 39 and so designed that the indications produced at the different positions of the sliding contact 36 are marked and cause signals corresponding in intensity to the series of signals sent out by the shore stations (Fig. 2).

An alternative method of varying the intensity of the signals is to adjust the distance between the coils 26 and 27, or to vary the capacity of the condenser 31. It is preferred, however, to arrange the variation permanently by means of a potentiometer 30.

Where the electromagnetic waves to be received are of different frequencies or tunes it is preferred to make the capacity 31 adjustable so that the oscillating circuit containing the capacity 31 and coil 27 can have its oscillation frequency varied as desired. A preferable means of accomplishing this result is, however, to keep the capacity 31 constant and use a variable inductance 37 as shown in Fig. 2. When a variable inductance is used the amount of energy in each discharge is not altered by changing the tune.

As is well known, lighthouses are distinguished by the character of the light given, i. e., red or white, and by duration and arrangement of flashes, in a similar manner a wireless station can be distinguished by the character, intensity, time interval, etc., of the signals emitted.

It will be understood by those skilled in the art that signaling apparatus on ships can be constructed to give out signals predetermined or otherwise, and that the receipt of these signals will indicate to other wireless stations, whether on land or ships, the presence in the neighborhood of other vessels. The signals from a ship can be of a definite character, either as regards the kind of signal, its intensity or the time interval between signals or a succession of signals, so that by the receipt of such signals by another station on ship or land, the presence of a particular vessel will be known. In case of two vessels having signaling apparatus, approaching each other in a fog and emitting signals, a comparison of the received signals with the standardizing apparatus will indicate to each vessel the distance of the other vessel from it and precautions can be easily taken to prevent any accident, and the character of the signal will indicate the names and kinds of vessels in proximity to each other. Of course the mere receipt of signals by one vessel from the other vessel will not indicate direction but only distance, and also whether vessels are approaching or going away from each other.

The apparatus herein shown and described for carrying out the method described is not claimed herein, but forms the subject matter of my co-pending application No. 275164, divided from this case and filed Aug. 21, 1905.

I claim herein as my invention,—

1. In the art of determining the position of vessels, the method described which consists in emitting signals of predetermined character from several stations of known position, receiving the same on the ship, producing signals of a definite predetermined character on the ship and comparing them with the signals from the stations of known position.

2. In the art of determining the position of vessels, the method described, which consists in sending signals of predetermined character from several stations of known position, receiving said signals on the vessel and measuring and comparing them with each other to fix the relative locations of the sending stations.

3. In the art of determining the position of vessels, the method described, which consists in sending from several stations of known position electromagnetic waves of predetermined character, receiving such signals on the vessel, producing and receiving similar signals of predetermined and definitely known character on the vessel, and comparing them with the signals received from outside.

4. In the art of determining the position of vessels relative to stations of known position, the method which consists in emitting from said stations predetermined signals differing in character for each of the several stations, receiving said signals on the vessel, and measuring and comparing their characteristics with each other, substantially as described.

5. In the art of determining the position of vessels, the method described, which consists in sending from a station of known position a signal of predetermined character, receiving the same on the vessel, and comparing its character as received with other standard signals of definitely known and predetermined character produced and received on the vessel.

6. For indicating the relative positions of a series of wireless telegraph stations, the method described which consists in sending from the stations electromagnetic wave signals of predetermined character and intensity, receiving the same on ship-board, measuring their character and intensity as received, and comparing them with each other, substantially as described.

7. For indicating the positions of vessels, the method described consisting in generating at several stations of known position electromagnetic waves forming a series of definite predetermined signals, each such signal varying in character from others in the series, receiving such signal on the vessel and producing and receiving on the vessel a similar signal corresponding to one in the said series and comparing it with the signal received from the station.

8. In the art of determining the position of vessels, the described method consisting in generating at a source of known location electromagnetic waves forming a series of signals of predetermined varying character, receiving such signals on the vessel and also receiving on the vessel other signals of similarly variant character and comparing the two sets of signals to relatively locate the known source of outside signals, substantially as described.

Signed at Washington, District of Columbia, this 14th day of December A. D. 1904.

REGINALD A. FESSENDEN.

Witnesses:
  THOMAS P. BROWN,
  JESSIE E. BENT.